United States Patent [19]

Sekimura et al.

[11] Patent Number: 4,786,148
[45] Date of Patent: Nov. 22, 1988

[54] COLOR FILTER HAVING DIFFERENT PRIMARY COLOR PIGMENT DENSITIES, INTER ALIA

[75] Inventors: Nobuyuki Sekimura, Kawasaki; Hideaki Takao, Sagamihara; Masaru Kamio, Atsugi; Tatsuo Murata, Ohme; Miki Tamura, Yokohama, all of Japan

[73] Assignee: Canon Kabushiki Kaisha, Tokyo, Japan

[21] Appl. No.: 130,610

[22] Filed: Dec. 9, 1987

[30] Foreign Application Priority Data

Dec. 10, 1986 [JP] Japan .................. 61-294361
Dec. 27, 1986 [JP] Japan .................. 61-309070
Dec. 27, 1986 [JP] Japan .................. 61-309072

[51] Int. Cl.$^4$ .................................. G02F 1/13
[52] U.S. Cl. .................. 350/339 F; 350/311; 350/317
[58] Field of Search ........... 350/311, 316, 317, 339 F, 350/350 S

[56] References Cited

U.S. PATENT DOCUMENTS 4,593,977  6/1986  Takamatsu et al. ............. 350/339 F
4,729,637  3/1988  Sato et al. ...................... 350/339 F
4,736,198  4/1988  Tokuyama et al. ......... 350/339 F X
4,743,098  5/1988  Dickerson et al. ............. 350/339 F

FOREIGN PATENT DOCUMENTS 0226218  6/1987  European Pat. Off. ........ 350/339 F
0159827  8/1985  Japan .............................. 350/339 F
0217337  10/1985  Japan .............................. 350/339 F Primary Examiner—Stanley D. Miller
Assistant Examiner—Richard F. Gallivan
Attorney, Agent, or Firm—Fitzpatrick, Cella, Harper & Scinto

[57] ABSTRACT

A color filter comprises a substrate and colored resin films, disposed on the support, including a blue resin film containing blue colorant particles dispersed therein, a green resin film containing green colorant particles dispersed therein and a red resin film containing red colorant particles dispersed therein. Scattering characteristic from the respective colored resin films is uniformized by satisfying the following conditions. The average particle volume $\overline{V_B}$, $\overline{V_G}$ and $\overline{V_R}$ of the blue, green and red colorants, respectively, are set to satisfy $\overline{V_B} < \overline{V_G} < \overline{V_R}$. The surface roughness of or the colorant content in the colored resin films is set to successively increase in the order of the blue resin film, the green resin film and the red resin film.

41 Claims, 5 Drawing Sheets

FIG. IA 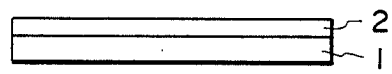
FIG. IB 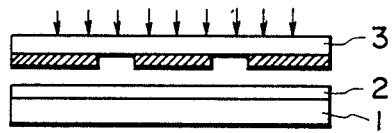
FIG. IC 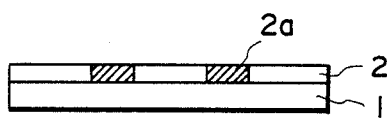
FIG. ID 
FIG. IE 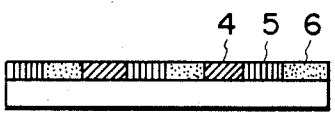
FIG. IF 

COLOR FILTER HAVING DIFFERENT PRIMARY COLOR PIGMENT DENSITIES, INTER ALIA

FIELD OF THE INVENTION AND RELATED ART

This invention relates to a color filter, particularly to a color filter suitable for fine color separation as used in color display, color image pick-up, color sensor and color display devices.

As a color filter, a dyed color filter obtained by providing a mordant layer comprising a hydrophilic polymeric material such as gelatin, casein, glue or polyvinyl alcohol on a substrate and dyeing the mordant layer with a colorant to form a color layer is conventionally known. Such a dyeing method has advantages in that there are a large number of available dyes and the required spectral characteristics can be satisfied with relative ease, but is accompanied with several difficulties such that a wet step of dipping a mordant layer in a dyeing bath containing a dye dissolved therein can be controlled only with difficulty is used for the step of dyeing the mordant layer and also complicated steps for providing an intermediate layer for prevention of dyeing for each layer are included, whereby the yield of production becomes poor. Also, the colorants which can be dyeable are relatively low in heat durability, namely up to a temperature of about 150° to 160° C., so that they are difficult to use where thermal treatment is required and the resultant dyed film is inferior in reliability with respect to heat-durability and light fastness.

As a color filter capable of solving the above problems, there has been proposed a color filter which comprises a colored resin wherein a certain type of colorant is dispersed in a transparent resin (as disclosed in e.g., Japanese Laid-Open Patent Application Nos. 46325/1983, 78401/1985, 184202/1985, 184203/1985, 184204/1985, 184205/1985, 16407/1982, 74707/1982 and 129707/1985). Thus, it has become possible to provide a color filter with heat durability and color fastness.

In case where a color filter of the type described above wherein a colorant, particularly a pigment, is dispersed in a resin, and is used as a color filter for fine or minute color separation, the color filter is composed to comprise a blue resin film, a green resin film and a red resin film arranged in a minute pattern (e.g., of $10^5$ $\mu m^2$ or smaller) of a mosaic or stripes.

It has now been found that, when such a color filter with dispersed pigment for color separation is applied to a color liquid crystal display picture, there arises a change in color balance among blue, green and red colors on the picture when a view angle toward the picture is changed. Particularly, as the view angle from the perpendicular axis to the display picture or screen increases, the proportions of the green color fraction and the red color fraction are decreased in this order, whereby there results in a bluish picture as a whole.

SUMMARY OF THE INVENTION

Accordingly, an object of the present invention is to provide a color filter which solves the above problems.

A specific object of the present invention is to provide a color separation filter applicable to a color liquid crystal display screen, a solid image pick-up device, an image sensor, etc.

According to a first aspect of the present invention, there is provided a color filter comprising a substrate and colored resin films, disposed on the support, including a blue resin film containing blue colorant particles dispersed therein, a green resin film containing green colorant particles dispersed therein, and a red resin film containing red colorant particles; wherein the average particle volume of the blue colorant particles $\overline{V_B}$, the average particle volume of the green colorant particles $\overline{V_G}$ and the average particle volume of the red colorant particles satisfy the relation of: $\overline{V_B} < \overline{V_G} < \overline{V_R}$.

According to a second aspect of the present invention, there is provided a color filter of the type generally described above wherein the surface roughness of the colored resin films successively increases in the order of the blue resin film, the green resin film, and the red resin film.

According to a third aspect of the present invention, there is provided a color filter of the type generally described above, wherein the colored resin films have a ratio P/V of the weight of the colorant (P) to the weight of the resin (W) in the resin films, which ratio P/V increases in the order of the blue resin film, the green resin film and the red resin film.

According to the present invention, the scattering effects of the blue resin film, the green resin film and the red resin film in response to incident light are equalized. As a result, even when the view angle from a viewer toward a display picture is changed, it is possible to prevent the change in color balance among blue, green and red on the display picture, whereby a color picture of a high quality can be displayed.

Furthermore, the color filter of the present invention may be composed of colored resin films comprising a resin having good mechanical strength and durability, such as heat durability, light fastness and solvent resistance, together with a pigment. Thus, a color filter having an excellent reliability may be obtained through a simple design and may be prepared with a fine pattern through a simple process involving only ordinary printing steps and photolithographic steps.

These and other objects, features and advantages of the present invention will become more apparent upon consideration of the following description of the preferred embodiments of the present invention taken in conjunction with the accompanying drawings.

BRIEF DESCRIPTION OF THE DRAWINGS

FIGS. 1A-1F are sectional views showing steps for illustrating a process for preparing a color filter of the present invention;

DESCRIPTION OF THE PREFERRED EMBODIMENTS

The average particle sizes of the blue (B), green (G) and red (R) pigment particles may be evaluated in terms of their average particle volumes. Now, if the average particle volume of the blue pigment particle is denoted by $\overline{V_B}$, that of the green pigment particles by $\overline{V_G}$, and that of the red pigment particles by $\overline{V_R}$, it is preferred to set these values to satisfy the relation of $\overline{V_B}:\overline{V_G}:\overline{V_R} = (0.4-0.6):(0.6-0.8):1$.

The average particle volume of the pigment particles of the respective colors may preferably be the range of $1.0\times10^{-6}$ $\mu m^3 - 1/0\times10^{-2}$ $\mu m^3$, particularly $1.0\times10^{-5}$ $\mu m^3 - 1.0\times10^{-3}$ $\mu m^3$.

Herein, the pigment particle sizes are evaluated by observing the colored resin films through an optical microscope or an SEM (scanning electron microscope).

A simplest method is to observe about 100 pigment particles in a colored resin film and obtain the average value in terms of an average particle volume.

In the present invention, the pigment particle sizes in a colored resin film may be set to a prescribed size in the following manner.

(1) Pigment particles preliminarily coated with a surface treating agent are passed through sieves to be adjusted into a prescribed size and then sufficiently dispersed in a resin solution by means of ultrasonic application, a three roll mill, etc., followed by forming into a colored resin film.

(2) Pigment particles are dispersed in a resin solution by means of ultrasonic application, a three-roll mill, etc., and the mixture is subjected to several times of filtering by using a filter, such as a filter paper to adjust the pigment particles in the resin solution to a prescribed size. Then, the resin solution containing the pigment particles are formed into a colored resin film.

Herein, "blue" refers to a color which shows a transmittance peak in the wavelength range of 400–500 nm, "green" to a color with a transmittance peak in the range of 500–600 nm, and "red" to a color with a transmittance peak in the range of 600–700 nm.

When light is incident on a particle, the light is scattered, and the scattering intensity is proportional to the square of the volume of the particle and to the reciprocal of the fourth power of the wavelength of the light if the particle size is smaller than the wavelength. This is known as Rayleigh scattering.

Accordingly, if a surface is uneven, scattering similar to Rayleigh scattering is inevitably caused. Thus, in a color filter, if a colored resin film has a rough surface, incident light thereon is inevitably subject to scattering.

Figure 7:
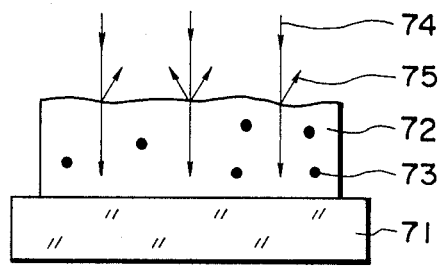
FIGS. 7 and 8A-8C are schematic sectional views illustrating dispersion of pigments in color filters of the present invention together with light scattering states thereby.

A scattering state of incident light is explained with reference to FIG. 7 which is an explanatory view for illustrating a scattering state of incident light due to the surface roughness of a colored resin film. Referring to the figure, on a substrate 71 is formed a colored resin film 72 in which pigment particles 73 are dispersed. When incident light 74 is caused to enter the colored resin film, the incident light is scattered due to the surface roughness of the colored resin film to form scattered light 75.

On the other hand, if the colored resin film in a color filter has a completely smooth surface, almost no scattering is caused. However, in the case of a color filter which is composed of a colored resin wherein a non-compatible pigment of a definite particle size is dispersed, the surface is inevitably tends to be rough.

However, surface roughness of a color filter comprising a colored resin film has not been considered heretofore. As a result, when blue, green and red color films are formed to have a substantially equal roughness, the blue resin film has caused the largest degree of scattering, the green resin film has caused the second largest degree of scattering, and the red resin film has caused the smallest degree of scattering.

Further, a colored resin film of the same blue color causes a larger degree of scattering as the surface roughness becomes larger.

In a conventional color filter of the colored resin type, the respective colored resin films of blue, green and red have provided different degrees or intensities of scattering, whereby in the case of a liquid crystal display device, for example, the appearances of the respective colors are different to provide a lower display quality.

Further, in the case of a sensor such as a solid-state image pick-up device, an unbalance in spectral characteristics is caused among the respective colors to degrade the performances of the sensor.

In the color filter of the present invention, the surface roughness of the colored resin films is set to increase in the order of the blue resin film, the green resin film and the red resin film, so that the scattering intensities from the respective colored resin films of blue, green and red are uniformized to provide a good color balance.

Herein, the surface roughness of the colored resin films are defined in terms of a central line average roughness (Ra) according to JIS B0601. Now, if the surface roughness of the blue resin film is denoted by $(Ra)_B$, that of the green resin film by $(Ra)_G$ and that of the red resin film by $(Ra)_R$, it is required to satisfy the relation of $(Ra)_B < (Ra)_G < (Ra)_R$. More specifically, it is preferred to satisfy the relation of $(Ra)_R:(Ra)_G:(Ra)_R = (0.7-0.85):(0.85-0.95):1.0$.

In order to measure the surface roughness, it is convenient to use a contact needle type "surface shape tester", such as Dektak 3030 (available from Throne Co.).

In the present invention, in order to adjust the surface roughness of the colored resin films, the following methods may be used:

(1) The size of a pigment to be dispersed in a resin is controlled to provide a required surface roughness.

(2) The surface of a colored resin film obtained in the above described manner is subjected to corona discharge to provide a required roughness.

Figure 8A:
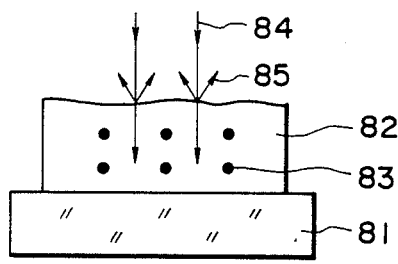
Figure 8B:
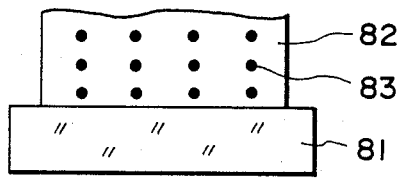
Figure 8C:
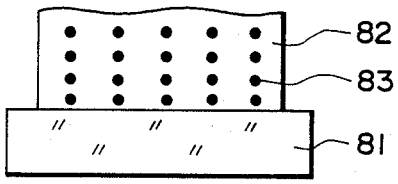

FIGS. 8A–8C are explanatory views illustrating the light scattering states of a colored resin film depending on the P/V ratio, i.e., the ratio of the weight of the pigment (P) to the weight of the resin (V) in the colored resin film. Referring to FIGS. 8A–8C, when incident light 84 enters a colored resin film containing pigment particles 83 in a resin 82 at a prescribed P/V ratio and found on a substrate, the incident light 84 is scattered due to the surface roughness depending on the P/V ratio to provide scattered light 85. The colored resin films shown in FIGS. 8A–8C are constituted to have successively increasing P/V ratios, thus providing successively increasing scattering rates.

When the P/V ratio of the blue resin film is denoted by $(P/V)_B$, that of the green resin film by $(P/V)_G$ and $(P/V)_R$, these ratios are set to satisfy the following relation in a preferred embodiment of the present invention:

$(P/V)_B < (P/V)_G < (P/V)_R$. More specifically, it is preferred to satisfy the relation of
$(P/V)_B:(P/V)_G:(P/V)_R = (0.5-0.8):(0.8-0.95):1.0$.

The P/V ratios of the respective color films may preferably be 2/1 or below, since the film formation becomes difficult as the pigment content increases. The P/V ratio can be accurately controlled by selecting the amounts of the resin and the pigment to be dispersed therein.

Colored resin films constituting the color filter of the present invention may comprise a resin which may preferably provide a cured or hardened film at a temperature of 300° C. or below when a thermosetting resin is used. Preferred examples of such a resin may include acrylic-type resins, polyamino-type resins including polyimide resins and polyamide resins, epoxy-type resins, urethane-type resins, polycarbonate-type resins, silicone resins, etc. Those showing no specific absorption in the visible wavelength region (400–700 nm) but showing a transmittance of about 90% or higher are particularly preferred.

Specific examples of the acrylic-type resins may include: JMC-25 available from Nippon Gohsei Gomu K.K. and RFG-10 available from Sekisui Fine Chemical K.K.

The above resins may exhibit photosensitivity by having a photosensitive group within their molecular structure. Such photosensitive groups may, for example, be provided by incorporating an aromatic chain having a photosensitive unsaturated hydrocarbon group, for example, as shown below together with a structural formula.

(1) benzoate chain:

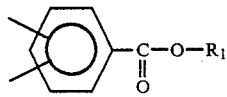

(wherein $R_1$ denotes $CHX=CY-COO-Z-$, wherein X is $-H$, or $C_6H_5$, Y is $-H$ or $-CH_3$, and Z is ethyl or glycidyl group)

(2) benzyl acrylate chain:

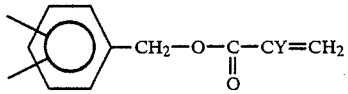

(wherein Y denotes $-H$ or $-CH_3$)

(3) diphenyl ether chain:

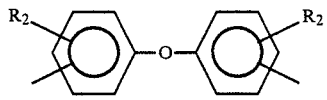

(wherein $R_2$ denotes hydrogen or a group of $CHX=CY-CONH-$, $CH_2=CY-COO-(CH_2)_2-OCO-$ or $CH_2=CY-COO-CH_2$ in which at least one of two $R_2$ is not hydrogen, and X and Y are the same as defined above)

(4) chalcone chain:

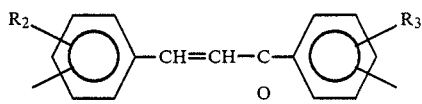

(wherein $R_3$ denotes H, alkyl or alkoxy group).

(5) other compound chains:

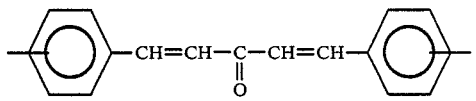

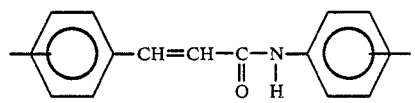

Specific examples of the aromatic polyamino resins (inclusive of polyamide resins and polyimide resins) may include Lithocoat PA-1000 (available from Ube Kohsan K.K.) and Lithocoat PI-400 (Ube Kohsan K.K.).

Few conventional photosensitive resins generally used in the photolithographic process provide excellent mechanical characteristics as well as durability such as heat durability, light fastness and solvent resistance which can be different depending on the structure. However, polyamino resins as described above are excellent in these durabilities in view of their chemical structures, so that a color filter obtained therefrom has excellent characteristics.

The colorants used in the colored resin films of the color filter according to the present invention may be any of organic pigments, inorganic pigments and dyes as far as they have desired spectral characteristics. Further, such colorants may be used alone or in combination of two or more species. When a dye is used, the performance of a color filter obtained therefrom is restricted to some extent. Even in this case, however, a color filter with better performance can be obtained than a conventional dyed color filter when a resin as described above is used in combination. In order to provide a color filter with further better performances in respect of color characteristic and other factors, it is best to use an organic pigment as a colorant to be used in the present invention. Each colored resin film may contain a colorant in a concentration of 10–70 wt. %, preferably 30–50 wt. % based on the total weight of the resin and the colorant.

Examples of the organic pigment may include azo pigments of the azo-type and condensed azo-type; phthalocyanine-type pigments, and further indigo-type, anthraquinone-type, perylene-type, perynone-type dioxazine-type, quinacridone-type, isoindolinone-type, quinophthalone-type, methine-type, azomethine-type, condensed polycyclic-type pigments including metal complex-type, and mixtures of these.

A colored resin film constituting the color filter of the present invention may be formed, for example, by preparing a solution of a resin as described above, e.g., a photosensitive polyamino-type resin; adding a colorant having a desired spectral characteristic in a proportion of about 10–50 wt. % of the total weight of the colorant and resin in the resin solution; dispersing the colorant in the resin solution by using an ultrasonic vibrator or a three roll mill, followed by filtration to remove larger particles; and applying the coating liquid onto a substrate by using an applicator such as a spinner coater, or a roller coater to form a colored resin film. The colored resin film is then subjected to a photographic step to provide a desired pattern of the film. The film thickness is determined by a required spectral characteristic but may desirably be about 0.5–5 μm, preferably about 1–2 μm.

While the colored resin film constituting the color filter of the present invention may be composed of a material which per se has a good durability, a protective layer can be further formed on the colored resin film in order to protect the colored resin film from various environmental conditions. Such a protective film may be composed of an organic resin such as polyamide, polyimide polyurethane, polycarbonate, or silicone resin, or an inorganic material, such as $Si_3N_4$, $SiO_2$, SiO, $Al_2O_3$ or $Ta_2O_3$ and formed by a coating method, such as spin coating or roller coating or by vapor deposition. The protective layer may be provided with an orientation or aligning treatment while it depends on a material thereof, so that it is applicable to a liquid crystal device. It is generally preferred that the thickness is set within the range of 5000 Å to 2μm.

The color filter of the present invention comprising colored resin films as described above may be formed on an appropriate substrate, which may for example be a glass plate, a transparent resin plate, a resin film, a cathode ray tube display face, the light-receiving face of an image pick-up tube, a wafer on which a solid image pick-up device, such as CCD, BBD, CID or BASIS has been formed, a contact-type image sensor, a liquid crystal display face, or a photosensitive member for color electrophotography.

If an increased bonding strength is required between the colored resin film and the substrate, it may be effective to apply a primer such as a silane coupling agent thinly on the substrate and then form a colored resin film pattern thereon, or to form a colored resin film by using a colored resin containing a small amount of a silane coupling agent, etc.

Hereinbelow, a typical process for producing a color filter of the present invention will be explained with reference to drawings.

FIGS. 1A–1F illustrate representative steps involved in a process for producing a color filter comprising a photosensitive colored resin according to the present invention. As shown in FIG. 1A, a prescribed substrate 1 is coated with a colored resin film 2 of a first color in a prescribed thickness by applying a coating liquid wherein a prescribed proportion of a colorant having a desired spectral characteristic is dispersed in a solution of a polyamino-type resin in N-methyl-2-pyrrolidone, followed by prebaking at an appropriate temperature. Then, as shown in FIG. 1B, the colored resin film is exposed to a light (such as a high-pressure mercury lamp) issuing light rays to which the photosensitive colored resin is sensitive through a photomask 3 having a prescribed pattern corresponding to the desired film pattern to be formed, whereby the exposed part of the colored resin is photo-cured.

As shown in FIG. 1C, the colored resin film 2 having the photo-cured portion 2a is then developed with a solvent such as one composed mainly of N-methyl-2-pyrrolidone capable of selectively dissolving the yet unexposed portion of the film under the application of ultrasonic vibration and then rinsed with, e.g., 1,1,1-trichloroethane, followed by postbaking to obtain a colored resin film pattern 4 as shown in FIG. 1D.

When a color filter of two or more colors according to the present invention is formed, the steps explained with reference to FIGS. 1A–1D are repeated by using a required number of colored resin coating liquids containing colorants corresponding to respective colors with particle sizes specified according to the present invention, whereby a color filter comprising colored resin film patterns 4, 5 and 6 with three different colors as shown in FIG. 1E is obtained, for example.

The color filter according to the present invention can have protective layer 7 of a material as described above on the colored film patterns as shown in FIG. 1F.

Figure 3:
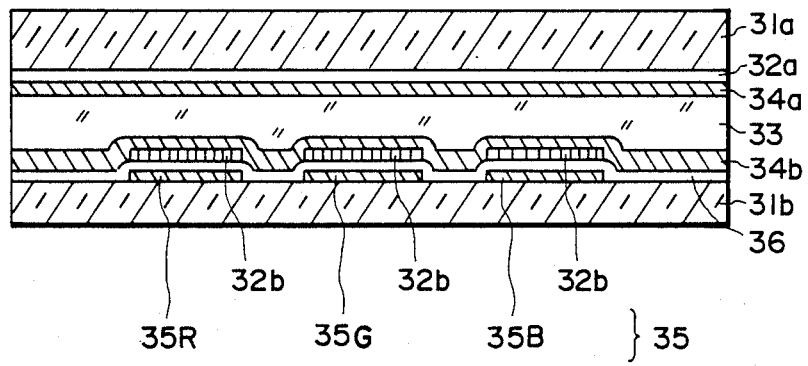
FIG. 3 is a sectional view of a liquid crystal cell incorporating a color filter of the present invention.

The color filter according to tee present invention is applicable to a substrate constituting a liquid crystal cell. FIG. 3 is a sectional view of a liquid crystal cell provided with a color filter of the present invention. The liquid crystal cell shown in FIG. 3 comprises a pair of an upper substrate 31 and a lower substrate 31b disposed in parallel with each other, and transparent electrodes 32a and 32b respectively disposed thereon. Between the upper substrate 31a and the lower substrate 31b is disposed a ferroelectric liquid crystal 33, preferably a ferroelectric liquid crystal of a non-helical structure showing at least two stable states.

The above-mentioned transparent electrodes 32a and 32b are disposed in the form of stripes so as to effect multiplex driving of the ferroelectric liquid crystal 33, preferably with their stripes crossing each other.

In the liquid crystal cell shown in FIG. 3, alignment control films 34a and 34b are disposed on the substrates 31a and 31b, respectively. The alignment control films 34a and 34b may respectively comprise a film of a polymer, such as polyimide, polyvinyl alcohol or polyamide treated by rubbing, or an oblique vapor deposition film of SiO, $SiO_2$, etc.

A color filter 35 according to the present invention comprising a blue resin film 35B, a green resin film 35G and a red resin film 35R arranged in the form of stripes or a mosaic is disposed on the lower substrate 31b. The color filter 35 is coated with a protective layer 36 which is similar to the protective layer described above.

In another preferred embodiment of the present invention, the transparent electrodes 32b shown in FIG. 3 may be disposed in contact with the lower substrate 31b, and the above-described color filter 35 and alignment control film 34b may be disposed in this order on the transparent electrodes 32b. In this case, it is possible to omit the protective layer 36, but such a protective layer may preferably be provided as an insulating layer in a case as described above wherein the ferroelectric liquid crystal 36 comprises a chiral smectic C liquid crystal disposed in a thickness sufficiently thin (e.g, 0.5 μm–10 μm) to release the helical structure of the chiral smectic C liquid crystal in the absence of an electric field, in order to prevent short circuitry between the transparent electrodes 32a and 32b.

An example of a liquid crystal-electro-optical device using this type of ferroelectric liquid crystal and having a matrix electrode structure is disclosed by Clark and Lagerwall in U.S. Pat. No. 4,367,924.

Examples of the ferroelectric liquid crystal to be used in a liquid crystal device incorporating a color filter of the present invention may include: p-decyloxybenzylidene-p'-amino-2-methylbutylcinnamate (DOBAMBC), p-hexyloxybenzylidene-p'-amino-2-chloropropylcinnamate (HOBACPC), p-decyloxybenzylidene-p'-amino-2- methylbutyl-α-cyanocinnamate (DOBAMBCC), p-tetradecyloxybenzylidene-p'-amino-2-methylbutyl-d-cyanocinnamate (TDOBAMBCC), p-octyloxybenzylidene-p'-amino-2-methylbutyl-o-chlorocinnamate (OOBAMBCC), p-octyloxybenzylidene-p'-amino-2-methylbutyl-α-methylcinnamate, 4,4'-azoxycinnamic acid-bis(2-methylbutyl)-ester, 4,O-(2-methyl)butylresorcylidene-4'-octylaniline, 4-(2'-methylbutyl)phenyl-4'-octyloxy-biphenyl-4-carboxylate, 4-hexyloxyphenyl-4-(2''-methyl-butyl)biphenyl-4'-carboxylate, 4-octyloxyphenyl-4-(2''-methylbutyl)biphenyl-4'-carboxylate, 4-heptyl-phenyl-4-(4''-methylhexyl)biphenyl-4'-carboxylate), and 4-(2''-methylbutyl)phenyl-4-(4''-methylhexyl)biphenyl-4'-carboxylate. These compounds may be used above or in combination of two or more species. Furthermore, another type of liquid crystal such as cholesteric liquid crystal or smectic liquid crystal can be added thereto within an extent that the resultant mixture shows ferroelectricity.

Hereinbelow, the present invention is explained with reference to more specific Examples.

EXAMPLE 1

A photosensitive blue resin coating liquid was prepared by dispersing a blue pigment (Heliogen Blue L7080 (trade name) available from BASF A.G., C.I. No. 74160) in a photosensitive polyamino-type resin (PA-1000 (trade name) available from Ube Kohsan K.K.; polymer content 10% in N-methyl-2-pyrrolidone (solvent)) in a weight ratio of pigment: polymer of 1:2. The coating liquid was subjected to two kinds of filtration with two sizes of membrane filters (SM113 available from Karl Zeiss GmbH), first with one having a size 1.5 times the desired size and then with the other having a size 0.8 times the desired size, whereby pigment particles having a size of about $0.060\mu$ were selected. The coating liquid with the pigment of the desired size dispersed therein was applied onto a glass substrate by means of a spinner coater into a thickness of 2.0 μm. The colored resin film thus formed was pre-baked at 80° C. for 30 min and then exposed to a high-pressure mercury lamp through a photomask with a pattern corresponding to the pattern to be formed. After the exposure, the colored resin film was developed with a specified developer consisting mainly of N-methyl-2-pyrrolidone under the application of an ultrasonic wave and then rinsed with a specified rinsing liquid consisting mainly of 1,1,1-trichloroethane, followed by post-baking at 150° C. for 30 min to obtain a blue-colored resin film pattern.

The blue resin film pattern was observed through an optical microscope to select 100 pigment particles at random and measure the diameters of the particles to obtain an average particle size in terms of an average volume of $1.1 \times 10^{-4} \mu^3$. The blue pigment particles were found to be uniformly dispersed in the resin.

A photosensitive resin coating liquid of green as a second color was then prepared by dispersing a green pigment (Lionel Green 6YK (trade name) available from Toyo Ink K.K.; C.I. No. 74265) in the same photosensitive resin (PA-1000 available from Ube Kohsan K.K.) as above in a weight ratio of pigment: polymer of 1:2. The coating liquid was subjected to being filtered twice in a similar manner as above to form a coating liquid selectively retaining therein pigment particles having a particle size of about $0.066\mu$ (diameter). This green coating liquid was applied over the above-formed blue resin film pattern on the substrate and then patterned to form a green resin film pattern at prescribed parts. Then average particle size of the green pigment particles uniformly dispersed in the green film pattern was then measured in a similar manner and found to be about $1.5 \times 10^{-4} \mu^3$ in terms of an average volume.

Further, a photosensitive coating liquid of red as a third color was prepared by dispersing a red pigment (Irgazin Red BPT (trade name) available from Ciba-Geigy A.G.; C.I. No. 71127) in the same photosensitive resin (PA-1000) as above in a weight ratio of pigment-:polymer of 1:2. The coating liquid was subjected to two times of filtration in a similar manner as above to form a coating liquid selectively retaining pigment particles having a particle size of about $0.076\mu$ (diameter). This red coating liquid was applied over the blue and green resin film patterns on the substrate and then patterned into a red resin film pattern at prescribed parts on the substrate. The average particle size of the red pigment particles uniformly dispersed in the red resin film pattern was measured in a similar as above and found to be about $2.3 \times 10^{-4} \mu^3$ in terms of an average volume. In this way, three color stripe patterns of R(red), G(green) and B(blue).

Figure 2:
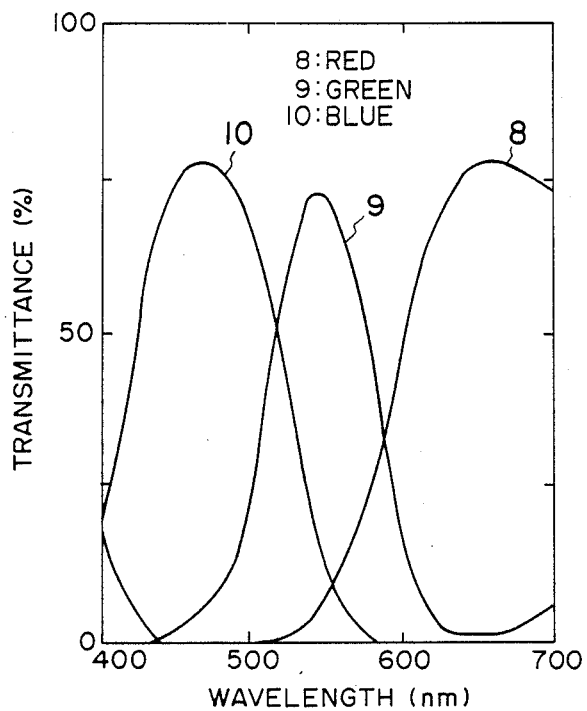
FIG. 2 is a graph showing the spectral transmittances of respective colored resin films of a color filter of the present invention obtained in Example 1.

The spectral characteristics of the three color filter patterns obtained in the above-described manner are shown in FIG. 2.

Scattered light from the color filter patterns were obtained by using an integrating sphere (210-2101 (trade name) available from Hitachi K.K.) were measured to obtain a substantially equal scattering rate of about 0.5% for the blue, green and red patterns, respectively. Herein, the scattering rate is defined as the proportion of the scattered light quantity to the incident light quantity.

The view angle dependency of the above-obtained color filter was examined while changing the view angle from the perpendicular axis to the color filter. As a result, the color filter provided a color balance at an angle at about 70° from the perpendicular axis which was substantially the same as the color balance as view in the direction of the perpendicular axis.

The color filter was excellent in heat durability and durable against even a temperature of above 250° C. As a result, it was possible to form an ITO (indium-tin-oxide) film forming a transparent electrode by sputtering on the color filter.

The color filter also showed a high hardness, was excellent in mechanical characteristics and accordingly did not cause any breakage when the color filter was disposed in contact with and pressed against spacer particles in a liquid crystal cell. Further, the color filter after the curing was excellent in solvent resistance, caused no change in subsequent production steps, and was also excellent in light fastness.

COMPARATIVE EXAMPLE 1

A color filter was prepared in the same manner as in Example 1 except that the particle sizes of the blue pigment, green pigment and red pigment were all adjusted to $1.5 \times 10^{-4} \mu m^3$ in terms of an average volume. The thus obtained color filter for comparison was examined with respect to the scattering rate in the same manner as in Example 1, whereby the scattering rate was measured to be about 1.0% for blue light (400–500 nm), about 0.5% for green light (500–600 nm) and about 0.3% for red light (600–700 nm).

The view angle dependency of the color filter for comparison was examined in the same manner as in Example 1. As a result, as the view angle exceeded 30° from the perpendicular axis to the color filter, the color filter gradually provided a bluish color tone.

EXAMPLE 2

A color liquid crystal device was prepared in the following manner through formation of a color filter of the present invention on a substrate provided with a thin film transistor.

Figure 4A:
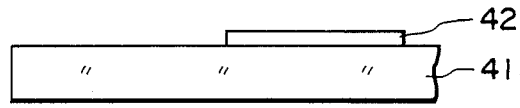
FIGS. 4A-4H are sectional views showing steps of a process for preparing a color liquid crystal display device incorporating a color filter of the present invention.
Figure 4B:
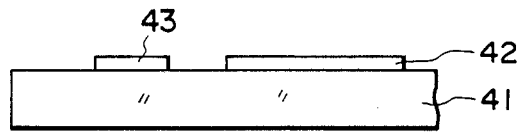

As shown in FIG. 4A, a 1000 Å-thick ITO film on a glass substrate 41 (7059 (trade name) available from Corning Glass Works) was patterned through a photolithographic step to form an ITO pixel electrode 42, on which a 1000 Å-thick aluminum layer was formed by vapor deposition and patterned by a photolithographic step to form a gate electrode 43 as shown in FIG. 4B.

Figure 4C:
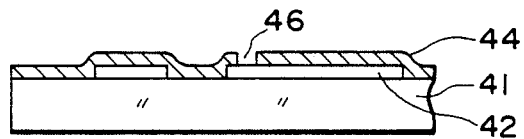

Then a photosensitive polyimide (Semicofine (trade name) available from Toray K.K.) was applied over the electrodes 42 and 43 on the substrate 41 to form an insulating layer 44, which was then subjected to pattern exposure and development to form a through hole 46 for forming a contact between the pixel electrode and a drain electrode 45 (as will be explained with reference to FIG. 4F hereinafter) as shown in FIG. 4C.

Figure 4D:
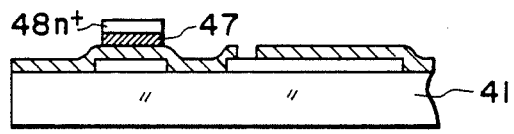
Figure 4E:
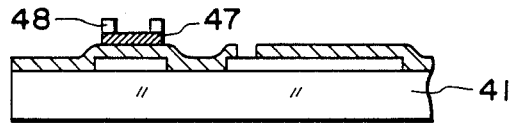

The substrate 41 was set at a prescribed position in a deposition chamber, in which $SiH_4$ diluted with $H_2$ was introduced and subjected to glow discharge under vacuum to deposit a photoconductive layer (intrinsic layer) 47 of 2000 Å-thick a-Si (amorphous silicon) over the entire surface of the substrate having the electrodes 42, 43 and the insulating layer 44. Thereafter, on the photoconductive layer 47, a 1000 Å-thick n+ layer 48 was laminated, and after the substrate 41 was removed from the deposition chamber, the laminate was patterned as shown in FIG. 4D and then the n+ layer 48 was selectively patterned as shown in FIG. 4E respectively by dry etching.

Figure 4F:
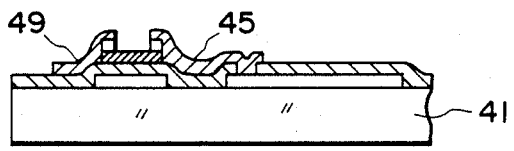

Further, a 1000 Å-thick Al layer was vapor deposited over the photoconductive layer 47 and n+ layer 48 on the substrate 41 and was patterned through a photolithographic step to form a source electrode 49 and a drain electrode 45 as shown in FIG. 4F.

Figure 4G:
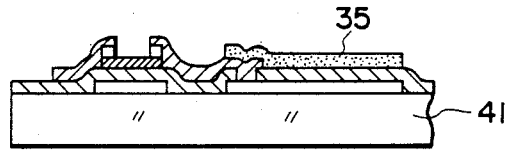
Figure 4H:
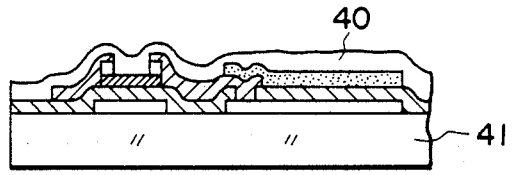

In alignment with each pixel electrode 42, a colored resin film (one of 35G, 35B and 35R) of a color filter 35 was formed as shown in FIG. 4G in a similar manner as explained in Example 1. Thereafter, the whole surface of the thus treated substrate 41 was coated with a 1200 Å-thick insulating film 40 of polyimide resin, which was then cured by heating at 250° C. for 1 hour and treated by rubbing to be provided with an alignment control function. Thus, a TFT (thin film transistor) substrate integrally provided with a three-color color filter 35 was prepared.

A color liquid crystal display device was prepared by using the thus prepared TFT substrate.

More specifically, a glass substrate (Corning 7059) was coated with a 1000 Å-thick ITO counter electrode and then with a 1200 Å-thick insulating layer of polyimide resin provided with an alignment control function. The thus obtained counter substrate and the above-prepared TFT substrate provided with a color filter were secured to each other with a sealing agent to form a blank cell, into which a twisted nematic liquid crystal (ZLI 123 (trade name) available from Merck Co.) was charged and sealed up to obtain a color liquid crystal display device.

The thus prepared liquid crystal device for color display was found to provide a display of an excellent quality.

EXAMPLE 3

A liquid crystal device for color display with a color filter of the present invention was prepared in the same manner as in Example 2 except that the three-color color filter was formed on the counter electrode instead of on the pixel electrodes.

The thus prepared liquid crystal device for color display was found to provide a display of an excellent quality.

EXAMPLE 4

A liquid crystal device for color display with a color filter of the present invention was prepared in the same manner as in Example 2 except that the three-color color filter was first formed on the counter substrate and then the counter electrode was formed thereon.

The thus prepared liquid crystal device for color display was found to provide a display of an excellent quality.

EXAMPLE 5

A wafer having a CCD (charge coupled device) formed thereon was provided as a substrate. A solid-state image pick-up device with a color filter of the present invention was prepared in the same manner as in Example 1 by using the substrate so that the each color pattern of the color filter was disposed in alignment with the respective photo-cells of the CCD to form a three-color stripe color filter.

The thus prepared color solid-state image pick-up device showed good color sensing performance free of flare.

EXAMPLE 6

A color filter prepared in the same manner as in Example 1 was applied to a wafer having a CCD formed thereon so that each color pattern of the color filter was disposed in alignment with the respective photo-cells of the CCD.

The thus prepared color solid-state image pick-up showed good color sensing performance free of flare.

EXAMPLE 7

Figure 5:
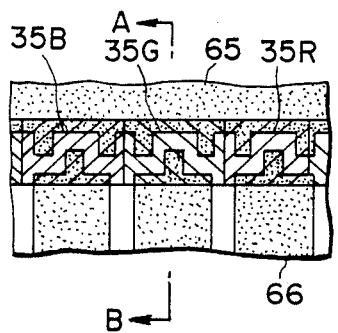
FIG. 5 is a partial schematic plan view of a color photosensor array provided with a color filter of the present invention.

A color photosensor array of which the structure is shown in a partial schematic plan view of FIG. 5 was prepared as will be explained with reference to FIGS. 6A–6G.

Figure 6A:
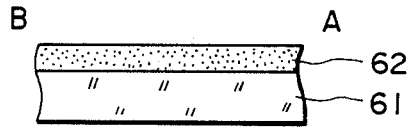
FIGS. 6A-6G are sectional views showing steps of a process for preparing the color photosensor array shown in FIG. 5.

As shown in FIG. 6A, a photoconductive layer (intrinsic layer) 62 of a-Si (amorphous silicon) was formed by the glow discharge process on a glass substrate (Corning 7059).

More specifically, $SiH_4$ diluted to 10% by volume with $H_2$ was subjected to glow discharge for 2 hours under the conditions of a gas pressure of 0.50 Torr, an RF (radio frequency) power of 10 W and a substrate temperature of 250° C., whereby the photoconductive layer 62 was formed by deposition in a thickness of 0.7 μm on the substrate 61.

Figure 6B:
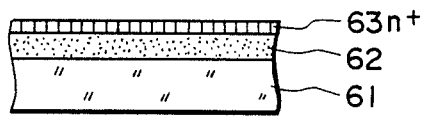

The photoconductive layer 62 was coated with an n+ layer 63 as shown in FIG. 6B by glow discharge. More specifically, $SiH_4$ diluted to 10% by volume with $H_2$ and $PH_3$ diluted to 100 ppm with $H_2$ were mixed to prepare a mixture starting gas, which was then subjected to glow discharge deposition under the same conditions as described above for deposition of the photoconductive layer 62, whereby a 0.1 μm-thick n+ layer 63 was formed contiguous to the photoconductive layer 62.

Figure 6C:
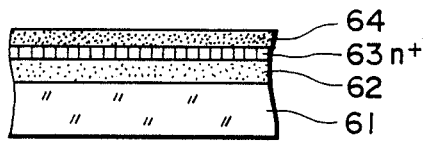
Figure 6D:
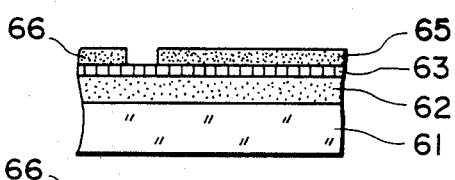

As shown in FIG. 6C, a 0.3 μm-thick Al layer 64 was deposited as a conductor layer by the electron-beam evaporation process on the n+ layer 63. A portion of the conductor layer 64 providing a photoconversion cell was then removed as shown in FIG. 6D.

More specifically, a desired photoresist pattern was formed on the Al layer 64 with a positive type photoresist (Microposit 1300-27 (trade name) available from Shipley Co.) and then the exposed portion (i.e., that portion not covered with the photoresist) of the conductor layer 64 was removed by an etchant solution comprising a mixture of an 85 vol. % aqueous solution of phosphoric acid, a 60 vol. % aqueous solution of nitric acid, glacial acetic acid and water in ratios of 16:1:2:1 to leave a common electrode 65 and individual electrodes 66.

Figure 6E:
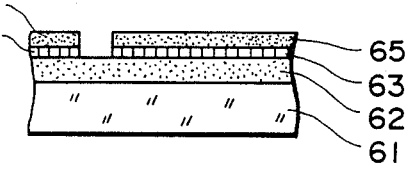

A portion of the n+ layer 63 providing a photoconversion cell was removed as shown in FIG. 6E.

More specifically, after removing the above positive-type photoresist from the substrate, the exposed portion of the n+ layer 63 and a part of the photoconductive layer 64 were removed by 5 minutes of dry etching with $CF_4$ gas at a pressure of 0.1 Torr in a parallel plate-type plasma etching apparatus (DEM-451, available from Nichiden Unerva K.K.) at an RF power of 120 W.

In this example, in order to prevent implantation of the cathode material (SUS) of the etching apparatus, a polysilicon sputtering target (8 inch, purity 99.999%) was placed on the cathode and the substrate was disposed thereon, and the exposed portion of the cathode material was covered with a teflon sheet cut into the shape of a donut, so that the etching was effected while almost no SUS face was exposed to plasma. Thereafter, the substrate was heat treated at 20° C. for 60 minutes in an oven with an atmosphere of nitrogen flowing at a rate of 3 l/min.

The surface of the thus formed photosensor array was coated with a protective layer 67 of silicon nitride by glow discharge.

Figure 6F:
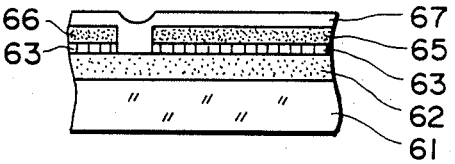
Figure 6G:
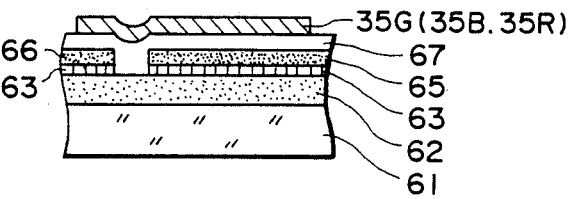

More specifically, $SiH_4$ diluted to 10% by volume with $H_2$ and 100% $NH_3$ were mixed at a flow ratio of 1:4 to obtain a mixture gas, and otherwise the glow discharge was effected in the same manner as in the formation of the a-Si layer 62, whereby a 0.5 μm-thick protective layer 67 of silicon nitride (a-SiNH) was prepared as shown in FIG. 6F.

By using the protective layer as the substrate, a color filter 35 including three color patterns of blue, green and red was formed in the same manner as in Example 1, whereby a color photosensor array as shown in FIG. 1 wherein each photosensor cell was provided one of the color patterns, was formed.

The photosensor array formed in this Example also showed good color sensing performance free of flare.

EXAMPLE 8

A color filter prepared in Example 1 was applied onto a photosensor array as shown in FIG. 6F prepared in Example 7 to form a color photosensor array.

The color photosensor array formed in this Example also showed good color sensing performance free of flare.

EXAMPLE 9

A photosensitive blue resin coating liquid was prepared by dispersing a blue pigment (Heliogen Blue L7080 (trade name) available from BASF A.G., C.I. No. 74160) adjusted to an average particle diameter of about 0.04μ in a photosensitive polyamino-type resin (PA-1000 (trade name) available from Ube Kohsan K.K.; polymer content 10% in N-methyl-2-pyrrolidone (solvent)) in a weight ratio of pigment:polymer of 1:2. The coating liquid was applied onto a glass substrate by means of a spinner coater into a thickness of 2.0 μm. The colored resin film thus formed was pre-baked at 80° C. for 30 min and then exposed to a high-pressure mercury lamp through a photomask with a pattern corresponding to the pattern to be formed. After the exposure, the colored resin film was developed with a specified developer consisting mainly of N-methyl-2-pyrrolidone under the application of an ultrasonic wave and then rinsed with a specified rinsing liquid consisting mainly of 1,1,1-trichloroethane, followed by post-baking at 150° C. for 30 min to obtain a blue-colored resin film pattern.

The blue resin film pattern was found to have an Ra (central line surface roughness) of about 90 Å.

A photosensitive resin coating liquid of green as a second color was prepared by dispersing a green pigment (Lionel Green 6YK (trade name) available from Toyo Ink K.K.; C.I. No. 74265) adjusted to an average particle diameter of about 0.045μ in the same photosensitive resin (PA-1000 available Ube Kohsan K.K.) as above in a weight ratio of pigment: polymer of 1:2. This green coating liquid was applied over the above-formed blue resin film pattern on the substrate and then patterned to form a green resin film pattern at prescribed parts. The green resin film pattern thus formed was found to have an Ra of about 100 Å.

Further, a photosensitive coating liquid of red as a third color was prepared by dispersing a red pigment (Irgazin Red BPT (trade name) available from Ciba-Geigy A.G.; C.I. No. 71127) adjusted to have an average particle diameter of about 0.05μ in the same photosensitive resin (PA-1000) as above in a weight ratio of pigment:polymer of 1:2. The red coating liquid was applied over the blue and green resin film patterns on the substrate and then patterned into a red resin film pattern at prescribed parts on the substrate. The red resin film pattern was found to have an Ra of about 110 Å. In this way, three color stripe patterns of R(red), G(green) and B(blue).

The spectral characteristics of the three color filter patterns obtained in the above-described manner were substantially the same as those shown in FIG. 2.

Scattered light from the color filter patterns were obtained by using an integrating sphere were measured to obtain a substantially equal scattering rate of 0.1% or below for the blue, green and red patterns, respectively. Thus, as the haze rate was small, an improved contrast could be obtained, whereby a color filter of good display quality was obtained.

Ordinarily, when scattering is considered, a green filter, for example, is to scatter blue light having a shorter wavelength than green to a larger extent. In an absorption-type color filter using a pigment as in the present invention, such blue light is absorbed by the pigment, whereby the scattering of blue light is advantageously minimized. As a result, scattering is to be considered only with respect to the wavelength of a desired color as in the present invention.

The color filter obtained above was excellent in heat durability and durable against even a temperature of above 250° C. As a result, it was possible to form an ITO film forming a transparent electrode by sputtering on the color filter.

The color filter also showed a high hardness, was excellent in mechanical characteristics and accordingly did not cause any breakage when the color filter was disposed in contact with and pressed against spacer particles in a liquid crystal cell. Further, the color filter after the curing was excellent in solvent resistance, caused no change in subsequent production steps, and was also excellent in light fastness.

COMPARATIVE EXAMPLE 2

A color filter was prepared in the same manner as in Example 9 except that the particle diameters of the blue pigment, green pigment and red pigment were all adjusted to about 0.06μ. The thus obtained color filter for comparison was examined with respect to the scattering rate, whereby the resultant scattering rate ranged 0.1-0.5% and changed depending on the colors.

EXAMPLE 10

A photosensitive blue resin coating liquid was prepared by dispersing a blue pigment (Heliogen Blue L7080 (trade name) available from BASF A.G., C.I. No. 74160) adjusted to an average diameter of about 0.045μ in a photosensitive polyamino-type resin (PA-1000 (trade name) available from Ube Kohsan K.K.; polymer content 10% in N-methyl-2-pyrrolidone (solvent)) in a P (pigment): V (resin) weight ratio of 0.6. The coating liquid was applied onto a glass substrate by means of a spinner coater into a thickness of 2.0 μm. The colored resin film thus formed was pre-baked at 80° C. for 30 min and then exposed to a high-pressure mercury lamp through a photomask with a pattern corresponding to the pattern to be formed. After the exposure, the colored resin film was developed with a specified developer consisting mainly of N-methyl-2-pyrrolidone under the application of an ultrasonic wave and then rinsed with a specified rinsing liquid consisting mainly of 1,1,1-trichloroethane, followed by post-baking at 150° C. for 30 min to obtain a blue-colored resin film pattern.

A photosensitive resin coating liquid of green as a second color was prepared by dispersing a green pigment (Lionel Green 6YK (trade name) available from Toyo Ink K.K.; C.I. No. 74265) with an average diameter of about 0.045μ in the same photosensitive resin (PA-1000 available from Ube Kohsan K.K.) as above in a P/V weight ratio of 0.9. This green coating liquid was applied over the above-formed blue resin film pattern on the substrate and then patterned to form a green resin film pattern at prescribed parts.

Further, a photosensitive coating liquid of red as a third color was prepared by dispersing a red pigment (Irgazin Red BPT (trade name) available from Ciba-Geigy A.G.; C.I. No. 71127) with an average diameter of about 0.045μ in the same photosensitive resin (PA-1000) as above in a P/V weight ratio of 1.0. This red coating liquid was applied over the blue and green resin film patterns on the substrate and then patterned into a red resin film pattern at prescribed parts on the substrate. In this way, three color stripe patterns of R(red), G(green) and B(blue).

Incidentally, the above resins may also be applied by other ordinary application or coating methods as by a roller coater, printing method, etc.

The spectral characteristics of the three color filter patterns obtained in the above-described manner were substantially the same as those shown in FIG. 2.

Scattered light from the color filter patterns were obtained by using an integrating sphere were measured to obtain a substantially equal scattering rate of 0.1% or below for the blue, green and red patterns, respectively.

The color filter was excellent in heat durability and durable against even a temperature of above 250° C. As a result, it was possible to form an ITO film forming a transparent electrode by sputtering on the color filter.

The color filter also showed a high hardness, was excellent in mechanical characteristics and accordingly did not cause any breakage when the color filter was disposed in contact with and pressed against spacer particles in a liquid crystal cell. Further, the color filter after the curing was excellent in solvent resistance, caused no change in subsequent production steps, and was also excellent in light fastness.

COMPARATIVE EXAMPLE 3

A color filter was prepared in the same manner as in Example 10 except that the P/V weight ratios of the blue pigment, green pigment and red pigment were all adjusted to 1.5. The thus obtained color filter for comparison was examined with respect to the scattering rate, whereby the resultant scattering rate ranged from 0.1 to 0.5% and changed depending on the colors.

As described above, according to the present invention, a color filter comprising three-colored resin film patterns of blue, green and red is provided, wherein a blue pigment, a green pigment and a red pigment having increasing average particle sizes in this order are dispersed in a resin having or not having a photosensitive group in its molecular structure. As a result, the following effects are accomplished.

The scattering rates or intensities from the resin patterns of the respective colors are made substantially the same, so that the view angle dependency of color balance is removed to remarkably improve display qualities in a display device using the color filter. For the same reason, the color characteristics of a sensor device are also improved.

A color filter according to the present invention can be prepared through simple production steps by using a colorant resin coating material, whereby the color filter having fine patterns is also provided with mechanical strengths and excellent characteristics in various respects, such as heat durability, light fastness, and solvent resistance.

As a result, the color filter of the present invention can be applicable to various devices requiring a color filter of good performances to provide color devices with excellent performances.

The color filter of the present invention can have variously changing spectral characteristics by selecting kinds of colorants and controlling the concentration and thickness of the colored resin film.

What is claimed is:

1. A color filter comprising a substrate and colored resin films, disposed on a support, including a blue resin film containing blue colorant particles dispersed therein, a green resin film containing green colorant particles dispersed therein, and a red resin film containing red colorant particles; wherein the average particle volume of the blue colorant particles $\overline{V_B}$, the average particle volume of the green colorant particles $\overline{V_G}$ and the average particle volume of the red colorant particles satisfy the relation of:
$$\overline{V_B} < \overline{V_G} < \overline{V_R}.$$

2. A color filter according to claim 1, wherein the colored resin films have been formed from a photosensitive resin having a photosensitive group in its molecular structure.

3. A color filter according to claim 1, wherein $\overline{V_B}$, $\overline{V_G}$ and $\overline{V_R}$ satisfy the relation of:
$$\overline{V_B}:\overline{V_G}:\overline{V_R} = 0.4-0.6:0.6-0.8:1.$$

4. A color filter according to claim 1, wherein $\overline{V_B}$, $\overline{V_G}$ and $\overline{V_R}$ are respectively in the range of $1.0 \times 10^{-6}$ $\mu m^3$ to $1.0 \times 10^{-2}$ $\mu m^3$.

5. A color filter according to claim 1, wherein $\overline{V_B}$, $\overline{V_G}$ and $\overline{V_R}$ are respectively in the range of $1.0 \times 10^{-5}$ $\mu m^3$ to $1.0 \times 10^{-3}$ $\mu m^3$.

6. A color filter according to claim 1, wherein the colored resin films contain a respective pigment in a proportion of 10 wt. % to 70 wt. %.

7. A color filter according to claim 1, wherein the colored resin films contain a respective pigment in a proportion of 30 wt. % to 50 wt. %.

8. A color filter according to claim 1, wherein the colorants are organic pigments.

9. A color filter according to claim 1, wherein the colored resin films were prepared from a photosensitive polyamino resin.

10. A color filter according to claim 1, which further comprises a protective layer on the colored resin films.

11. A color filter according to claim 10, which further comprises a transparent electrode on the protective layer.

12. A color filter according to claim 1, which further comprises a transparent electrode on the colored resin films.

13. A color filter according to claim 1, which further comprises a transparent electrode between the colored resin films and the substrate.

14. A color filter according to claim 1, which further comprises an alignment control layer to be in contact with a liquid crystal on the colored resin films.

15. A color filter according to claim 14, wherein said liquid crystal is a ferroelectric liquid crystal.

16. A color filter according to claim 15, wherein said ferroelectric liquid crystal is a chiral smectic liquid crystal.

17. A color filter according to claim 14, wherein said liquid crystal is a twisted nematic liquid crystal.

18. A color filter comprising a substrate and colored resin films, disposed on a support, including a blue resin film containing a blue colorant dispersed therein, a green resin film containing a green colorant dispersed therein and a red resin film containing a red colorant dispersed therein; wherein the surface roughness of the colored resin films successively increases in the order of the blue resin film, the green resin film, and the red resin film.

19. A color filter according to claim 18, wherein the colorants are organic pigments.

20. A color filter according to claim 18, wherein the colored resin films were prepared from a photosensitive polyamino resin.

21. A color filter according to claim 18, which further comprises a protective layer on the colored resin films.

22. A color filter according to claim 21, which further comprises a transparent electrode on the protective layer.

23. A color filter according to claim 18, which further comprises a transparent electrode on the colored resin films.

24. A color filter according to claim 18, which further comprises a transparent electrode between the colored resin films and the substrate.

25. A color filter according to claim 18, which further comprises an alignment control layer to be in contact with a liquid crystal on the colored resin films.

26. A color filter according to claim 25, wherein said liquid crystal is a ferroelectric liquid crystal.

27. A color filter according to claim 26, wherein said ferroelectric liquid crystal is a chiral smectic liquid crystal.

28. A color filter according to claim 25, wherein said liquid crystal is a twisted nematic liquid crystal.

29. A color filter comprising a substrate and colored resin films, disposed on a support, including a blue resin film containing a blue colorant dispersed therein, a green resin film containing a green colorant dispersed therein and a red resin film containing a red colorant dispersed therein; wherein the colored resin films have a ratio P/V of the weight of the colorant (P) to the weight of the resin (W) in the resin films, which ratio P/V increases in the order of the blue resin film, the green resin film and the red resin film.

30. A color filter according to claim 29, wherein the colored resin films contain a respective pigment in a proportion of 10–70 wt. %.

31. A color filter according to claim 29, wherein the colored resin films contain a respective pigment in a proportion 30–50 wt. %.

32. A color filter according to claim 29, wherein the colorants are organic pigments.

33. A color filter according to claim 29, wherein the colored resin films were prepared from a photosensitive polyamino resin.

34. A color filter according to claim 29, which further comprises a protective layer on the colored resin films.

35. A color filter according to claim 34, which further comprises a transparent electrode on the protective layer.

36. A color filter according to claim 29, which further comprises a transparent electrode on the colored resin films.

37. A color filter according to claim 29, which further comprises a transparent electrode between the colored resin films and the substrate.

38. A color filter according to claim 29, which further comprises an alignment control layer to be in contact with a liquid crystal on the colored resin films.

39. A color filter according to claim 38, wherein said liquid crystal is a ferroelectric liquid crystal.

40. A color filter according to claim 39, wherein said ferroelectric liquid crystal is a chiral smectic liquid crystal.

41. A color filter according to claim 38, wherein said liquid crystal is a twisted nematic liquid crystal.

* * * * *

UNITED STATES PATENT AND TRADEMARK OFFICE
CERTIFICATE OF CORRECTION

PATENT NO. : 4,786,148
DATED : November 22, 1988
INVENTOR(S) : NOBUYUKI SEKIMURA, ET AL.

Page 1 of 3

It is certified that error appears in the above-identified patent and that said Letters Patent is hereby corrected as shown below:

AT [75] IN INVENTORS

"Tatsuo Murata, Ohme;" should read
--Tatsuo Murata, Tokyo;--.

COLUMN 2

Line 5, "particles;" should read --particles dispersed therein;--.
Line 9, "particles satisfy" should read --particles $\overline{V_R}$ satisfy--.
Line 20, "resin (W)" should read --resin (V)--.

COLUMN 3

Line 16, "$1.0 \times 10^{-6} \mu m - 1/0 \times 10^{-2} \mu m^3$," should read --$1.0 \times 10^{-6} \mu m - 1.0 \times 10^{-2} \mu m^3$,--.

COLUMN 4

Line 38, "$(Ra)_R:(Ra)_G:-$" should read --$(Ra)_B:(Ra)_G:-$ --.
Line 39, "$(Ra)_R=(0.7-0.85):(0.850.95):1.0.$" should read --$(Ra)_R=(0.7-0.85):(0.85-0.95):1.0.$--.
Line 68, "$(P/V)_R,$" should read --that of the red resin film by $(P/V)_R,$--.

UNITED STATES PATENT AND TRADEMARK OFFICE
CERTIFICATE OF CORRECTION

PATENT NO. : 4,786,148
DATED : November 22, 1988
INVENTOR(S) : NOBUYUKI SEKIMURA, ET AL.

Page 2 of 3

It is certified that error appears in the above-identified patent and that said Letters Patent is hereby corrected as shown below:

COLUMN 6

Lines 1-6, " 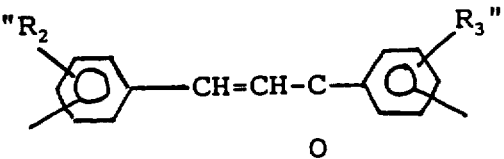 "

should read -- 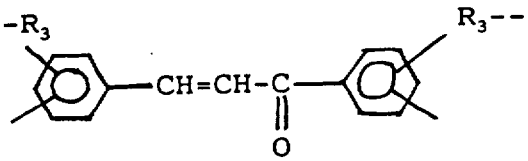 --

COLUMN 8

Line 20, "upper substrate 31" should read --upper substrate 31a--.

COLUMN 9

Line 4, "-o-chlorocinnamate" should read -- -α-chlorocinnamate--.
Line 15, "above" should read --alone--.

COLUMN 16

Line 68, "particles;" should read --particles dispersed therein;--

UNITED STATES PATENT AND TRADEMARK OFFICE
CERTIFICATE OF CORRECTION

PATENT NO. : 4,786,148

DATED : November 22, 1988

INVENTOR(S) : NOBUYUKI SEKIMURA, ET AL.   Page 3 of 3

It is certified that error appears in the above-identified patent and that said Letters Patent is hereby corrected as shown below:

COLUMN 18

Line 30, "resin (W)" should read --resin (V)--.
Line 38, "proportion 30-50 wt. %." should read --proportion of 30-50 wt. %.--.

Signed and Sealed this

Twentieth Day of June, 1989

Attest:

DONALD J. QUIGG

Attesting Officer   Commissioner of Patents and Trademarks